(12) United States Patent
Takashima et al.

(10) Patent No.: US 12,529,121 B2
(45) Date of Patent: Jan. 20, 2026

(54) HOT-PRESSED MEMBER AND METHOD FOR PRODUCING THE SAME

(71) Applicant: JFE STEEL CORPORATION, Tokyo (JP)

(72) Inventors: Katsutoshi Takashima, Tokyo (JP); Yoshie Obata, Tokyo (JP); Hiroshi Matsuda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 246 days.

(21) Appl. No.: 18/021,287

(22) PCT Filed: Jun. 22, 2021

(86) PCT No.: PCT/JP2021/023498
§ 371 (c)(1),
(2) Date: Feb. 14, 2023

(87) PCT Pub. No.: WO2022/044510
PCT Pub. Date: Mar. 3, 2022

(65) Prior Publication Data
US 2023/0295762 A1    Sep. 21, 2023

(30) Foreign Application Priority Data

Aug. 28, 2020  (JP) ................................ 2020-144107

(51) Int. Cl.
| | | |
|---|---|---|
| *C21D 9/46* | (2006.01) | |
| *B32B 15/01* | (2006.01) | |
| *C21D 6/00* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/12* | (2006.01) | |
| *C22C 38/14* | (2006.01) | |
| *C22C 38/60* | (2006.01) | |

(52) U.S. Cl.
CPC .............. *C21D 9/46* (2013.01); *B32B 15/013* (2013.01); *C21D 6/005* (2013.01); *C21D 6/008* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C22C 38/60* (2013.01); *C21D 2211/001* (2013.01); *C21D 2211/003* (2013.01); *C21D 2211/008* (2013.01)

(58) Field of Classification Search
CPC .......... B32B 14/013; C21D 1/18; C21D 1/26; C21D 1/673; C21D 6/005; C21D 6/008; C21D 7/13; C21D 8/0205; C21D 7/0226; C21D 7/0263; C21D 9/46; C21D 2211/001; C21D 2211/003; C21D 2211/008; C22C 38/001; C22C 38/002; C22C 38/008; C22C 38/02; C22C 38/04; C22C 38/06; C22C 38/08; C22C 38/12; C22C 38/14; C22C 38/16; C22C 38/24; C22C 38/28; C22C 38/38; C22C 38/60; Y02P 10/20

See application file for complete search history.

(56) References Cited

U.S. PATENT DOCUMENTS

| | | | |
|---|---|---|---|
| 2019/0119772 A1* | 4/2019 | Terazawa | ................ C22C 38/04 |
| 2020/0131596 A1* | 4/2020 | Takashima | ............... C21D 1/25 |
| 2020/0332382 A1* | 10/2020 | Takashima | ................ C23C 2/12 |
| 2020/0353527 A1* | 11/2020 | Takashima | ........... C21D 8/0426 |

FOREIGN PATENT DOCUMENTS

| | | |
|---|---|---|
| CN | 111344425 A | 6/2020 |
| EP | 3680359 A1 | 7/2020 |
| JP | 5942841 B2 | 6/2016 |
| JP | 6062352 B2 | 1/2017 |
| JP | 2017-179432 A | 10/2017 |
| WO | 2019/003539 A1 | 1/2019 |
| WO | 2019/003543 A1 | 1/2019 |
| WO | 2019/093384 A1 | 5/2019 |
| WO | 2020/170667 A1 | 8/2020 |

OTHER PUBLICATIONS

Sep. 14, 2021 International Search Report issued in International Patent Application No. PCT/JP2021/023498.
Jun. 24, 2024 Office Action issued in Chinese Application 202180055364.8.
Aug. 2, 2023 Extended European Search Report issued in European Patent Application No. 21860940.2.
Sep. 21, 2024 Office Action issued in Chinese Application No. 202180055364.8.
Jan. 21, 2025 Office Action issued in Korean Application No. 10-2023-7004646.

* cited by examiner

*Primary Examiner* — Seth Dumbris
(74) *Attorney, Agent, or Firm* — Oliff PLC

(57) ABSTRACT

A hot-pressed member having a specified chemical composition in which Ti/Sb 2.0≤Ti/Sb≤20.0 is satisfied and a method for producing the hot-pressed member. The hot-pressed member has a microstructure in which a volume fraction of martensite is 95% or more, an average grain size of prior austenite is 7 μm or less, the number of cementite grains with a grain size of 0.10 μm or more is 2 grains/μm$^2$ or more, and the number of Ti-based carbide grains with a grain size of 0.10 μm or less is 0.20 grains/μm$^2$ or more, and a tensile strength of 2100 MPa or higher.

6 Claims, No Drawings

HOT-PRESSED MEMBER AND METHOD FOR PRODUCING THE SAME

TECHNICAL FIELD

This application relates to a hot-pressed member having both a tensile strength of 2100 MPa or higher and excellent delayed fracture resistance, and a method for producing the hot-pressed member.

BACKGROUND

In recent years, $CO_2$ emission regulations have become stricter because of growing concern about environmental problems, and the automobile industry has faced challenges in weight reduction of automotive bodies to improve fuel efficiency. To solve the challenges, high strength steel sheets have been increasingly used in automotive parts to achieve thickness reduction, and the use of steel sheets with a tensile strength (TS) of 2100 MPa or higher has been studied. High strength steel sheets used for automotive structural members and reinforcing members need to have high formability. However, steel sheets with a TS of 2100 MPa or higher have low ductility and thus crack during cold press forming or undergo springback because of high yield strength, so that high dimensional accuracy is not obtained after cold press forming. In addition, the residual stress remains in steel sheets after cold press forming, and there is therefore concern about delayed fracture (hydrogen embrittlement) caused by hydrogen intrusion from the operating environment.

Under such circumstances, press forming by hot pressing (also referred to as, for example, hot stamping, die quenching, or press quenching) has recently attracted attention as a technique for obtaining high strength. Hot pressing is a forming method that involves heating a steel sheet to a temperature range of austenite single phase and then forming (processing) the steel sheet while keeping it at high temperature to achieve forming with high dimensional accuracy and that involves performing quenching by cooling after forming to increase strength. The residual stress after press forming in the hot pressing is lower than that in cold pressing, which improves delayed fracture resistance.

In the automobile assembly process, however, hot-pressed members after hot pressing are subjected to stress in order to maintain the rigidity of an automobile body when the hot-pressed members are assembled by resistance spot welding or other methods after press forming. There is therefore concern about delayed fracture after press forming. There is thus a need to improve the delayed fracture resistance of hot-pressed members after hot pressing.

In the related art, there have been some reports on methods for improving delayed fracture resistance after hot pressing.

For example, Patent Literature 1 discloses a technique for improving delayed fracture resistance by controlling the amounts of alloy carbonitride and cementite precipitation.

Patent Literature 2 discloses a technique for improving delayed fracture resistance by forming retained austenite after hot pressing.

CITATION LIST

Patent Literature

Patent Literature 1: Japanese Patent No. 6062352
Patent Literature 2: Japanese Patent No. 5942841

SUMMARY

Technical Problem

However, in the methods of Patent Literature 1 and Patent Literature 2, it is difficult to improve delayed fracture resistance in a high strength region of a tensile strength of 2100 MPa or higher, and no hot-pressed member having these properties has been developed so far under the present circumstances.

This application is directed to a hot-pressed member having both a tensile strength of 2100 MPa or higher and excellent delayed fracture resistance, and a method for producing the hot-pressed member.

Solution to Problem

As a result of intensive studies under the above circumstances, the inventors have found that the delayed fracture resistance of a hot-pressed member is improved as follows: cementite is dispersedly precipitated in the member to reduce the solute carbon content in martensite and, at the same time, reduce the dislocation density, whereby the microstructure of the member is converted into martensite with high toughness; and in addition, a fine Ti-based carbide is dispersed to form hydrogen trap sites.

When a member is strengthened by increasing the hardness of martensite, the member has low toughness and may fracture at a lower strength than the actual strength of the member upon collision during actual driving after finishing as an automobile body. To solve this issue, there is a need to increase the toughness while ensuring strength. In addition, hydrogen is electrochemically generated on the member because of rain or other factors during actual repeated driving, and part of hydrogen intrudes into the member. If no stress is generated in the member in this case, no delayed fracture due to the hydrogen occurs, but the member is subjected to stress in some areas after hot pressing in order to keep the stiffness of the entire automobile body. The cathode reaction of the corrosion reaction caused by rain or other factors mainly involves the oxygen reduction reaction, but partially involves the hydrogen reduction reaction. It is found that the delayed fracture resistance is improved as follows: tempering is performed at low temperature after hot pressing to cause dispersed precipitation of cementite and provide martensite properties with low dislocation density, whereby toughness is restored, and cementite serve as hydrogen trap sites at the same time. It is also found that a Ti-based carbide also provides hydrogen trap sites having high activation energy required for desorption of hydrogen to prevent or reduce delayed fracture and thus to provide preferable delayed fracture resistance even at a tensile strength of 2100 MPa or higher.

The disclosed embodiments have been accomplished on the basis of the above findings. The gist of the disclosed embodiments is as described below.

[1] A hot-pressed member includes: a chemical composition containing, in terms of mass %, C: 0.41% or more and 0.53% or less, Si: 0.01% or more and 0.80% or less, Mn: 1.0% or more and 2.0% or less, P: 0.03% or less, S: 0.003% or less, Al: 0.01% or more and 0.10% or less, N: 0.006% or less, Nb: 0.003% or more and 0.018% or less, Ti: 0.008% or more and 0.100% or less, B: 0.0005% or more and 0.0050% or less, and Sb: 0.003% or more and 0.015% or less, with the balance being Fe and incidental impurities, wherein Ti/Sb satisfies 2.0≤Ti/Sb≤20.0; a microstructure in which a volume fraction of martensite is 95% or more, an average grain size of prior austenite is 7 μm or less, the number of cementite grains with a grain size of 0.10 μm or more is 2 grains/μm$^2$ or more, and the number of Ti-based carbide grains with a grain size of 0.10 μm or less is 0.20 grains/μm$^2$ or more; and a tensile strength of 2100 MPa or higher.

[2] In the hot-pressed member according to [1], the chemical composition further contains, in terms of mass %, one or two or more selected from Mo: 0.35% or less, Cr: 0.35% or less, V: 0.05% or less, Ca: 0.005% or less, Cu: 0.50% or less, Ni: 0.50% or less, and Sn: 0.50% or less.

[3] In the hot-pressed member according to [1] or [2], the hot-pressed member has an Al-based coating layer or a Zn-based coating layer on a surface thereof.

[4] A method for producing a hot-pressed member includes: heating a cold rolled steel sheet having the chemical composition according to [1] or [2] to a temperature range of an Ac$_3$ transformation temperature or higher and 1000° C. or lower, followed by hot pressing; then cooling the steel sheet to a temperature lower than or equal to Ms temperature −200° C.; and reheating the steel sheet at a reheating temperature of 100° C. or higher and 220° C. or lower for a holding time of 1 minute or more and 40 minutes or less.

Advantageous Effects

The disclosed embodiments can provide a hot-pressed member having both a tensile strength of 2100 MPa or higher and excellent delayed fracture resistance.

DETAILED DESCRIPTION

The disclosed embodiments will be explained below in detail. First, the reason for limiting the composition of the hot-pressed member of the disclosed embodiments will be explained. Hereinafter, the unit "%" of components means mass %.

C: 0.41% or More and 0.53% or Less

Carbon is an element effective for strengthening steel sheets and is an important element for strengthening martensite after hot pressing to increase steel strength. However, if the C content is less than 0.41%, the hardness of martensite after hot pressing is insufficient to obtain tensile strength. The C content is preferably 0.42% or more. If the C content is more than 0.53%, the toughness is so low that fracture occurs before plastic instability, and tensile strength is not obtained. The C content is preferably less than 0.52%, more preferably less than 0.50%.

Si: 0.01% or More and 0.80% or Less

Silicon is an element effective for solid solution strengthening of ferrite to increase strength. However, the presence of excessive Si degrades chemical convertibility, and the Si content is thus 0.80% or less. The Si content is preferably 0.70% or less. Significantly low Si leads to an increase in costs, and the Si content is thus 0.01% or more.

Mn: 1.0% or More and 2.0% or Less

Manganese is an element that increases hardenability during hot pressing and thus contributes to martensite formation after hot pressing, that is, contributes to strength increase. To obtain this effect, the Mn content needs to be 1.0% or more. The Mn content is preferably 1.2% or more. The presence of excessive Mn generates excessive Mn bands to produce martensite with high hardness and easily causes cracking at the time of hydrogen intrusion to reduce delayed fracture resistance. The Mn content is thus 2.0% or less. The Mn content is preferably 1.8% or less.

P: 0.03% or Less

Phosphorus contributes to strength increase by solid solution strengthening. The presence of excessive P causes significant segregation of P at grain boundaries and results in grain boundary embrittlement, which results in low delayed fracture resistance. The P content is therefore 0.03% or less. The P content is preferably 0.02% or less. There is no lower limit, but the P content is preferably 0.0005% or more because very low P leads to an increase in steel making costs.

S: 0.003% or Less

At high S content, many sulfides such as MnS are produced, and such inclusions serve as starting points for cracking to cause cracking, which results in low delayed fracture resistance. The upper limit of the S content is therefore 0.003%. The S content is preferably 0.002% or less. There is no lower limit, but the S content is preferably 0.0001% or more because, like P, very low S leads to an increase in steel making costs.

Al: 0.01% or More and 0.10% or Less

Aluminum is an element necessary for deoxidation. To obtain this effect, the Al content needs to be 0.01% or more. If the Al content is more than 0.10%, the effect reaches saturation. The Al content is therefore 0.10% or less. The Al content is preferably 0.09% or less.

N: 0.006% or Less

Nitrogen forms a coarse nitride to degrade bending collapse resistance, and the N content thus needs to be low. If the N content is more than 0.006%, this tendency is noticeable. The N content is therefore 0.006% or less. The N content is preferably 0.005% or less. The lower limit of N may be 0%, but preferably 0.0003% or more from the viewpoint of production costs.

Nb: 0.003% or More and 0.018% or Less

Niobium is an element that can contribute to strength increase by forming fine carbonitrides and that reduces the austenite grain size during hot pressing, which contributes to improved delayed fracture resistance. To obtain these effects, the Nb content is 0.003% or more. The Nb content is preferably 0.005% or more. The presence of a large amount of Nb causes the effects described above to reach saturation and rather degrades the toughness of slab to increase production costs. The Nb content is therefore 0.018% or less. The Nb content is preferably 0.016% or less.

Ti: 0.008% or More and 0.100% or Less

Titanium is an element that can contribute to strength increase by forming fine carbonitrides. In particular, a fine Ti carbide serve as strong hydrogen trap sites and is very effective for ensuring delayed fracture resistance. To obtain these effects, the Ti content is 0.008% or more. The presence of a large amount of Ti significantly reduces elongation after hot pressing, and the Ti content is therefore 0.100% or less. The Ti content is preferably 0.06% or less.

B: 0.0005% or More and 0.0050% or Less

Boron is an element that increases hardenability during hot pressing and thus contributes to martensite formation after hot pressing, that is, contributes to strength increase. In addition, boron is segregated at grain boundaries to improve grain boundary strength and is thus effective for ensuring delayed fracture resistance. To obtain this effect, the B content is 0.0005% or more. However, the presence of excessive B generates a coarse precipitate together with N and thus reduces delayed fracture resistance. The B content is therefore 0.0050% or less. The B content is preferably 0.0035% or less.

Sb: 0.003% or More and 0.015% or Less

Antimony has an effect of suppressing formation of a decarburized layer in a steel sheet surface layer when a steel sheet is exposed to a high temperature (until hot pressing after heating the steel sheet before hot pressing). This effect makes the potential distribution of the surface uniform and improves delayed fracture resistance. Suppressing decarburization provides a predetermined Ti-based carbide. To obtain these effects, the Sb content is 0.003% or more. The Sb content is preferably 0.004 or more. If the Sb content is more than 0.015%, the rolling load increases, and the productivity decreases. The Sb content is therefore 0.015% or less. The Sb content is preferably 0.012% or less.

$$2.0 \leq Ti/Sb \leq 20.0$$

Ti/Sb affects precipitation of the Ti-based carbide. Here, Ti/Sb is the ratio of the Ti content to the Si content (mass %). If Ti/Sb is more than 20.0, that is, the Ti content is too high or the Sb content is too low, the steel has low carbon content, and the Ti-based carbide is precipitated from high temperatures, so that the Ti-based carbide coarsens, and a desired fine Ti-based carbide is not obtained. If Ti/Sb is less than 2.0, that is, the Ti content is too low or the Sb content is too high, a small amount of the Ti-based carbide is produced. To produce a predetermined Ti-based carbide and to obtain the effect of improving delayed fracture resistance, Ti/Sb is 2.0 or more and 20.0 or less. Here, Ti/Sb is preferably 15.0 or less. Ti/Sb is more preferably 10.0 or less. The lower limit is preferably 3.0 or more, more preferably 4.0 or more.

In the disclosed embodiments, one or two or more of the following components may be contained in addition to the components described above.

Mo: 0.35% or Less

Molybdenum is an element that increases hardenability during hot pressing and thus contributes to martensite formation after hot pressing, that is, contributes to strength increase. However, the addition of a large amount of Mo causes the above effects to reach saturation and results in high costs and low chemical convertibility. The Mo content is thus preferably 0.35% or less. When Mo is contained, the Mo content is preferably 0.005% or more to obtain the effect of Mo. The Mo content is more preferably 0.01% or more.

Cr: 0.35% or Less

Like Mo, Chromium is also an element that increases hardenability during hot pressing and thus contributes to martensite formation after hot pressing, that is, contributes to strength increase. However, the addition of a large amount of Cr causes the above effects to reach saturation and forms an oxide on the surface, which results in poor coatability. The Cr content is thus preferably 0.35% or less. When Cr is contained, the Cr content is preferably 0.005% or more to obtain the effect of Cr. The Cr content is more preferably 0.01% or more.

V: 0.05% or Less

Vanadium is an element that can contribute to strength increase by forming fine carbonitrides. Since V has such an effect, 0.01% or more V is preferably contained. The addition of a large amount of V reduces delayed fracture resistance, and the V content is therefore preferably 0.05% or less.

Ca: 0.005% or Less

Calcium controls the shapes of sulfides and oxides and suppresses formation of coarse MnS, which improves delayed fracture resistance. To obtain these effects, the Ca content is preferably 0.0005% or more. Since addition of excessive Ca degrades workability, the Ca content is preferably 0.005% or less.

Cu: 0.50% or Less

Copper contributes to strength increase by solid solution strengthening and increases hydrogen overpotential to improve delayed fracture resistance. To obtain these effects, the Cu content is preferably 0.002% or more. The presence of more than 0.50% Cu causes the effects to reach saturation and tends to generate Cu-induced surface defects to reduce delayed fracture resistance. The Cu content is therefore preferably 0.50% or less.

Ni: 0.50% or Less

Like Cu, nickel can improve corrosion resistance and reduce a potential difference between a weld and a nut or volt to improve delayed fracture resistance. When Ni is added together with Cu, Ni has an effect of suppressing Cu-induced surface defects. To obtain these effects, the Ni content is preferably 0.05% or more. However, the addition of a large amount of Ni degrades bending collapse resistance to reduce tensile shear stress. The Ni content is therefore preferably 0.50% or less.

Sn: 0.50% or Less

Like Cu, tin can improve corrosion resistance to improve delayed fracture resistance, and thus Sn can be added as necessary. To obtain these effects, the Sn content is preferably 0.05% or more. However, the addition of a large amount of Sn reduces delayed fracture resistance, and the Sn content is therefore preferably 0.50% or less.

The balance other than the components described above is Fe and incidental impurities. Examples of the incidental impurities include Zn, Co, Zr, Ta, and W. The acceptable ranges of the contents of these elements are Zn: 0.01% or less, Co: 0.10% or less, Zr: 0.10% or less, Ta: 0.10% or less, and W: 0.10% or less.

Next, the microstructure of the hot-pressed member of the disclosed embodiments will be explained in detail.

In the microstructure of the hot-pressed member in the disclosed embodiments, a volume fraction of martensite is 95% or more, an average grain size of prior austenite is 7 µm or less, the number of cementite grains with a grain size of 0.10 µm or more is 2 grains/µm$^2$ or more, and the number of Ti-based carbide grains with a grain size of 0.10 µm or less is 0.20 grains/µm$^2$ or more. The volume fraction as used herein is a volume fraction relative to the entire steel sheet. The same applies hereinafter.

If the volume fraction of martensite is less than 95%, a desired tensile strength is not obtained. The volume fraction of martensite is therefore 95% or more. The remaining microstructure may include ferrite, bainite, pearlite, and retained austenite. When the total volume fraction of these phases is less than 5%, the advantageous effects of the disclosed embodiments are achievable.

If the average grain size of prior austenite of the hot-pressed member is more than 7 µm, the delayed fracture resistance degrades. The average grain size of prior austenite is therefore 7 µm or less. The average grain size of prior austenite is preferably 6 µm or less.

The number of cementite grains with a grain size of 0.10 µm or more is 2 grains/µm$^2$ or more. If the number of cementite grains with a grain size of 0.10 µm or more is less than 2 grains/µm$^2$, tempering of martensite is so insufficient that fracture occurs before plastic instability, and a desired tensile strength is not obtained. In addition, the cementite grains do not function as adequate hydrogen trap sites, which results in low delayed fracture resistance. There is no upper limit, but the number of cementite grains with a grain size of 0.10 µm or more is preferably 30 grains/µm$^2$ or less.

The number of Ti-based carbide grains with a grain size of 0.10 µm or more is 0.20 grains/µm$^2$ or more. If the number of Ti-based carbide grains with a grain size of 0.10 µm or more is less than 0.20 grains/µm², the Ti-based carbide grains do not function as hydrogen trap sites, which results in low delayed fracture resistance. There is no upper limit, but the number of Ti-based carbide grains with a grain size of 0.10 µm or more is preferably 0.90 grains/µm² or less.

The microstructure of the hot-pressed member in the disclosed embodiments can be measured by the method described below in Examples.

Next, the coating layer of the hot-pressed member of the disclosed embodiments will be explained in detail.

The hot-pressed member of the disclosed embodiments may not have a coating layer, or may have a coating layer on the surface of the hot-pressed member in order to prevent oxidation caused by hot pressing or improve corrosion resistance. When the hot-pressed member has a coating layer on the surface, a portion of the member excluding the coating layer has the chemical composition and the microstructure described above.

In the disclosed embodiments, the coating layer is preferably an Al-based coating layer or a Zn-based coating layer. The coating layer prevents the steel sheet surface from being oxidized by hot pressing and further improves the corrosion resistance of the hot-pressed member.

Examples of the Al-based coating layer include an Al—Si coating layer formed by hot-dip coating method. Examples of the Zn-based coating layer include a galvanizing layer formed by hot-dip coating method, a galvannealing layer formed by subjecting the galvanizing layer to an alloying treatment, an electrogalvanizing layer formed by electroplating, and a Zn—Ni alloy electroplating layer.

Here, the Al-based coating layer or the Zn-based coating layer is not limited to the layers described above, and may be a coating layer containing, in addition to a main component Al or Zn, one or two or more elements selected from Si, Mg, Ni, Fe, Co, Mn, Sn, Pb, Be, B, P, S, Ti, V, W, Mo, Sb, Cd, Nb, Cr, Sr, and other elements. The method for forming the Al-based coating layer or the Zn-based coating layer is not limited and may be any one of known hot-dip coating, electroplating, and vapor deposition. The Al-based coating layer or the Zn-based coating layer may be a coating layer formed by performing an alloying treatment after the coating process.

In the disclosed embodiments, in particular, the Zn-based coating layer is more preferably a Zn—Ni alloy coating layer in order to further improve the corrosion resistance of the hot-pressed member and prevent liquid metal embrittlement cracking caused by molten Zn during hot press forming.

When a cold rolled steel sheet before hot pressing having an Al-based coating layer or a Zn-based coating layer is hot-pressed, some or all of coating layer components contained in the Al-based coating layer or the Zn-based coating layer diffuse into a base steel sheet to form a solid solution phase or an intermetallic compound, and at the same time, conversely, Fe which is a component of the base steel sheet diffuses into the Al-based coating layer or the Zn-based coating layer to form a solid solution phase or an intermetallic compound. In addition, an Al-containing oxide film is formed on the surface of the Al-based coating layer, and an oxide film containing Zn is formed on the surface of the Zn-based coating layer.

For example, when an Al—Si coating layer is heated, the coating layer is converted into a coating layer mainly composed of a Fe—Al intermetallic compound containing Si. Heating a galvanizing layer, galvannealing layer, an electrogalvanizing layer, or other layers forms a FeZn solid solution phase in which Zn is dissolved in Fe, a ZnFe intermetallic compound, a ZnO layer in the surface layer, or other layers. Heating the Zn—Ni alloy electroplating layer forms a Ni-containing solid solution layer in which coating layer components are dissolved in Fe, an intermetallic compound mainly composed of ZnNi, a ZnO layer in the surface layer, or other layers.

In the disclosed embodiments, as described above, an Al-containing coating layer formed by heating a cold rolled steel sheet before hot pressing having an Al-based coating layer is referred to as an Al-based coating layer, and a Zn-containing coating layer formed by heating a cold rolled steel sheet before hot pressing having a Zn-based coating layer is referred to as a Zn-based coating layer.

The coating weight of the coating layer is not limited as long as it is generally accepted. For example, the coating weight of the coating layer on one side is preferably 5 to 150 g/m². If the coating weight of the coating layer is less than 5 g/m², it may be difficult to ensure corrosion resistance. If the coating weight of the coating layer is more than 150 g/m², the exfoliation resistance may deteriorate.

Next, a method for producing a hot-pressed member according to the disclosed embodiments will be explained.

A cold rolled steel sheet having the component composition (chemical composition) described above is heated to a temperature range of an $Ac_3$ transformation temperature or higher and 1000° C. or lower, followed by hot pressing. Subsequently, the steel sheet is cooled to a temperature lower than or equal to Ms temperature −200° C. and then reheated at a reheating temperature of 100° C. or higher and 220° C. or lower for a holding time of 1 minute or more and 40 minutes or less.

First, suitable conditions for producing the cold rolled steel sheet before hot pressing will be explained.

[Hot Rolling Step]

The method for making a steel material (steel slab) is not limited and may be any one of known steelmaking methods using a converter, an electric furnace, a vacuum melting furnace, and the like. The casting method is not limited, and a desired size is formed by a known casting method, such as a continuous casting method. Instead of the continuous casting method, the ingot-making and blooming method can be used without any problem. Molten steel may be further subjected to secondary refining, such as ladle refining.

Preferably, the steel slab used as a material is reheated after casting, held at 1250° C. or higher and 1400° C. or lower for 80 minutes or more and 180 minutes or less, and then starts to be hot-rolled. If the heating temperature is lower than 1250° C. or the heating time is less than 80 minutes, the amount of Ti-based precipitate redissolved is reduced, and a coarse Ti-based precipitate remains after hot pressing, which results in low delayed fracture resistance. The heating temperature is more preferably 1270° C. or higher. If the heating temperature is higher than 1400° C. or the heating time is more than 180 minutes, the grain size increases, and a desired grain size is not obtained after final annealing, which results in low delayed fracture resistance. More preferably, the heating temperature is 1350° C. or lower, or the heating time is 150 minutes or less.

In the disclosed embodiments, the produced steel slab may be subjected to an energy-saving process, such as direct rolling, without any problem, in addition to a conventional method in which the produced steel slab is cooled to room temperature and then reheated. In the direct rolling, the produced steel slab is placed in a heating furnace without cooling while it is warm, rolled immediately after heat retention, or rolled directly after casting.

Finish Rolling Delivery Temperature: 850° C. or Higher and 950° C. or Lower

Hot rolling needs to be finished in the austenite single phase region in order to improve the delayed fracture resistance after annealing by homogenizing the microstructure in the steel sheet and reducing the anisotropy of the material. The finish rolling delivery temperature is therefore preferably 850° C. or higher. If the finish rolling delivery temperature is over 950° C., the hot rolled microstructure coarsens, and the crystal grains after annealing also coarsens. The upper limit of the finish rolling delivery temperature is therefore preferably 950° C.

Cooling to 500° C. or Lower at Average Cooling Rate of 80° C./s or More

The austenite undergoes ferrite transformation during the cooling process after the end of hot rolling, but the ferrite coarsens at high temperatures, and the microstructure of the steel sheet is thus homogenized as much as possible by performing quenching after the end of hot rolling. The steel sheet is then quenched in order to finely disperse the Ti carbide or dissolve part of the Ti carbide. Therefore, the steel sheet is preferably cooled to 500° C. or lower at an average cooling rate of 80° C./s or higher. If the average cooling rate is lower than 80° C./s, the ferrite is coarsened, and the hot rolled steel sheet has a non-uniform microstructure, which leads to low delayed fracture resistance after hot pressing. If the finish cooling temperature is higher than 500° C., the Ti carbide in the steel sheet microstructure of the hot rolled steel sheet coarsens, which results in low delayed fracture resistance after hot pressing.

Coiling Temperature: 500° C. or Lower

If the coiling temperature is higher than 500° C., the Ti carbide in the steel sheet microstructure of the hot rolled steel sheet coarsens, which results in low delayed fracture resistance after hot pressing. The upper limit of the coiling temperature is therefore preferably 500° C. in the disclosed embodiments. The coiling temperature is more preferably 450° C. or lower. The lower limit of the coiling temperature is not limited but, if the coiling temperature is too low, hard martensite is excessively formed to increase the cold rolling load. The lower limit is therefore preferably 300° C. or higher.

[Pickling Step]

After the hot rolling step, pickling is performed to remove scale from the surface layer of the hot rolled sheet. The pickling treatment is not limited and may be carried out according to a conventional method.

[Cold Rolling Step]

The cold rolling step for rolling a cold rolled sheet with a predetermined thickness is performed. The cold rolling step is not limited and may be carried out according to a conventional method.

[Annealing Step]

In the annealing step, fine ferrite grains are produced by promoting recrystallization after cold rolling. This step allows fine equiaxed growth of recrystallized grains generated during hot pressing to improve tensile strength and delayed fracture resistance. To achieve this, the steel sheet is preferably heated to a temperature range of 600° C. or higher and 700° C. or lower at an average heating rate of 5° C./s or higher and 35° C./s or lower, held at a soaking temperature in a temperature range of 600° C. or higher and 700° C. or lower for 30 seconds or more and 600 seconds or less, and then cooled from the soaking temperature to room temperature.

Average Heating Rate: 5° C./s or Higher and 35° C./s or Lower

Grains after annealing can be made finer by controlling the heating rate in the annealing step. The upper limit of the average heating rate is preferably 35° C./s since rapid heating hinders the progress of recrystallization. If the average heating rate is less than 5° C./s, the crystal grains coarsen, and the grain size after hot pressing increases. The lower limit of the average heating rate is therefore preferably 5° C./s.

Soaking Temperature: 600° C. or Higher and 700° C. or Lower, Holding Time: 30 Seconds or More and 600 Seconds or Less The soaking temperature is in a temperature range higher than the recrystallization temperature. If the soaking temperature is lower than 600° C. or the holding time is less than 30 seconds, the recrystallization does not sufficiently proceed, which results in low delayed fracture resistance after hot pressing. If the soaking temperature is higher than 700° C. or the holding time is more than 600 seconds, the Ti-based carbide coarsens. Therefore, the soaking temperature is preferably 600° C. or higher and 700° C. or lower, and the holding time is preferably 30 seconds or more and 600 seconds or less.

The cold rolled steel sheet may be subjected to temper rolling. The elongation percentage in temper rolling is preferably 0.05% or more and 2.0% or less.

Subsequently, the cold rolled steel sheet may be subjected to a coating treatment, such as hot-dip galvanization, or the cold rolled steel sheet may be used as it is without such a coating treatment. The cold rolled steel sheet for hot pressing in the disclosed embodiments may be used as a cold rolled steel sheet produced by the production process described above, but may be subjected to a coating process for forming an Al-based coating layer or a Zn-based coating layer according to its purpose.

The coating process is not limited and may be any one of known hot-dip coating, electroplating, and vapor deposition. The coating process may be followed by an alloying treatment.

Next, the production conditions for hot-pressing the obtained cold rolled steel sheet will be explained.

In the disclosed embodiments, a cold rolled steel sheet used as a material is heated to a temperature range of an $Ac_3$ transformation temperature or higher and 1000° C. or lower, followed by hot pressing. Subsequently, the steel sheet is cooled to a temperature lower than or equal to Ms temperature −200° C. and then reheated at a reheating temperature of 100° C. or higher and 220° C. or lower for a holding time of 1 minute or more and 40 minutes or less.

First, the cold rolled steel sheet is heated to a temperature range of an $Ac_3$ transformation temperature or higher and 1000° C. or lower. The volume fraction of austenite is low at temperatures below the $Ac_3$ transformation temperature, and the volume fraction of martensite is less than 95% after hot pressing, so that tensile strength cannot be ensured. The grain size excessively increases at temperatures higher than 1000° C., which results in low delayed fracture resistance. The heating time is not limited, but preferably 0 seconds or more and 600 seconds or less. This is because, if the heating time is more than 600 seconds, the grain size excessively increases to degrade delayed fracture resistance. The heating furnace used for heating is not limited but may be, for example, an electric furnace, a gas furnace, an electric heating furnace, or a far-infrared heating furnace.

The Ac$_3$ transformation temperature can be determined from the following formula.

$$Ac_3 \text{ transformation temperature } (°C.)=881-206C+53Si-15Mn-20Ni-1Cr-27Cu+41Mo$$

In the formula, each element symbol represents the amount (mass %) of the corresponding element. Any element not contained is calculated as 0.

The heated steel sheet is transferred to a pressing machine and hot-pressed. The temperature during hot pressing is not limited, but preferably in a range of 550° C. or higher and 800° C. or lower.

After hot pressing, the steel sheet is cooled to a temperature lower than or equal to Ms temperature −200° C. At a temperature above Ms temperature −200° C., martensite transformation is not completed, and the steel sheet microstructure fails to have a desired volume fraction of martensite. To ensure martensite, the cooling attainment temperature is a temperature lower than or equal to Ms temperature −200° C., preferably a temperature lower than or equal to Ms temperature −140° C., more preferably a temperature lower than or equal to Ms temperature −120° C.

The Ms temperature can be determined from the following formula.

$$Ms \text{ temperature } (°C.)=561-474C-33Mn-17Ni-17Cr-21Mo$$

In the formula, each element symbol represents the amount (mass %) of the corresponding element. Any element not contained is calculated as 0.

The cooling rate until the cooling attainment temperature after completion of hot pressing is not necessarily limited but, if the cooling rate is higher than 80° C./s, the toughness of martensite decreases to degrade delayed fracture. If the cooling rate is much lower than 20° C./s, it is difficult to ensure strength. Therefore, the cooling rate is preferably 20° C./s or higher and 80° C./s or lower.

Next, the steel sheet is reheated at a reheating temperature of 100° C. or higher and 220° C. or lower for a holding time of 1 minute or more and 40 minutes or less. Reheating after hot pressing is an important process in the disclosed embodiments because cementite is coarsened by reheating. The steel sheet is reheated in a temperature range of 100° C. or higher and 220° C. or lower for 1 minute or more and 40 minutes or less. If the reheating temperature is lower than 100° C., the solute carbon content increases to degrade delayed fracture resistance. If the reheating temperature is higher than 220° C., the Ti carbide coarsens, and the delayed fracture resistance cannot be ensured. If the holding time is less than 1 second, the solute carbon content increases to degrade delayed fracture resistance. If the holding time is more than 40 minutes, the Ti carbide coarsens, and the delayed fracture resistance cannot be ensured.

The hot-pressed member of the disclosed embodiments can be produced as described above.

EXAMPLES

Next, Examples according to the disclosed embodiments will be explained. It should be understood that the disclosed embodiments are not intended to be limited by the Examples described below and can be appropriately modified and carried out within the range of the spirit of the disclosed embodiments, and all of the modifications are included in the technical scope of the disclosure.

Steels with the chemical compositions shown in Table 1 were made, continuously cast into slabs, and hot-rolled at the heating temperatures and the finish rolling delivery temperatures (FDTs) shown in Table 2. Next, the obtained hot rolled steel sheets were cooled to the finish cooling temperatures at the average cooling rates shown in Table 2, then cooled to coiling temperatures (CTs), and coiled into coils.

Next, the obtained hot rolled sheets were pickled and then cold-rolled into cold rolled sheets (thickness: 1.4 mm).

The cold rolled steel sheets thus produced were annealed under the conditions shown in Table 2 in a continuous annealing line (CAL) or a continuous galvanizing line (CGL). The steel sheets that had passed through the continuous annealing line (CAL) were cold rolled steel sheets (CR). The steel sheets that had passed through the CGL were hot-dip galvanized steel sheets (GI) and hot-dip aluminized steel sheets (AS). Some of the steel sheets that had passed through the CGL were subjected to a hot-dip galvanizing treatment and then subjected to an alloying treatment at 550° C. to provide hot-dip galvannealed steel sheets (GA). Furthermore, some were annealed in the CAL and then subjected to an electrogalvanizing line (EGL) to provide electrodeposited zinc nickel coated steel sheets (EZN).

Next, the obtained cold rolled steel sheets (including coated steel sheets) were hot-pressed.

The mold used in the hot pressing had a punch width of 70 mm, a punch shoulder R of 4 mm, and a die shoulder R of 4 mm, and the forming depth was 30 mm. Each cold rolled steel sheet was heated in the atmosphere using either an infrared heating furnace or an atmosphere heating furnace depending on the heating rate. Each steel sheet was cooled after pressing by combining sandwiching of the steel sheet between the punch and the die with natural cooling on the die released from the sandwiching, whereby the steel sheet was cooled from the press (start) temperature to room temperature.

A JIS No. 5 test piece for tensile test was taken from the position of the hat bottom portion of each hot-pressed member thus produced and subjected to tensile testing according to JIS Z 2241 to measure the tensile strength (TS).

With regard to delayed fracture resistance testing, a JIS No. 5 test piece for tensile test was taken from the position of the hat bottom portion of each hot-pressed member and subjected to constant load testing. The test piece for tensile test was subjected to a load while being immersed in a solution of hydrochloric acid with pH=3, and whether the test piece fractured was evaluated. When the test piece did not fracture under a load stress of 800 MPa for 100 hours or more, the delayed fracture resistance was evaluated as good (A). When the test piece fractured under a load stress of 800 MPa in less than 100 hours, the delayed fracture resistance was evaluated as poor (B).

To determine the volume fraction of martensite of the hot-pressed member, a test piece was taken from the hot-pressed member such that the cross section parallel to the rolling direction and the thickness direction of the cold rolled steel sheet before hot pressing was an observation surface. After being polished, the observation surface was etched in 3 vol % initial and observed with a SEM (scanning electron microscope) at a magnification of 5000 times. The area fraction was determined by a point count method (in accordance with ASTM E562-83 (1988)) and defined as a volume fraction.

The average grain size of prior austenite in the hot-pressed member was determined as described below. A test piece was taken from the hot-pressed member such that the cross section parallel to the rolling direction and the thickness direction of the cold rolled steel sheet before hot pressing was an observation surface. After being polished, the observation surface was etched in 3 vol % nital and observed with a SEM (scanning electron microscope) at a magnification of 3000 times. The circle equivalent diameters of prior austenite grains were calculated by using Image-Pro available from Media Cybernetics, and the average value of the circle equivalent diameters was calculated.

To obtain the grain size of cementite, the hot-pressed member was observed with a TEM (transmission electron microscope) at a magnification of 15000 times. The grain size was determined by calculating the circle equivalent diameter of cementite using Image-Pro. The lower limit of the circle equivalent diameter was 0.005 μm. To determine the number of cementite grains with a grain size of 0.10 μm or more, the number of cementite grains with a grain size of 0.10 μm or more present per μm$^2$ was calculated, and the average number of cementite grains at arbitrarily selected 20 points was defined as the number of cementite grains with a grain size of 0.10 μm or more in the disclosed embodiments.

To obtain the grain size of the Ti-based carbide, the hot-pressed member was observed with a TEM at a magnification of 20000 times. The grain size was determined by calculating the circle equivalent diameter of the Ti-based carbide using Image-Pro. The lower limit of the circle equivalent diameter was 0.005 μm. To determine the number of Ti-based carbide grains with a grain size of 0.10 μm or less, the number of Ti-based carbide grains with a grain size of 0.10 μm or less present per μm$^2$ was calculated, and the average number of Ti-based carbide grains at arbitrarily selected 20 points was defined as the number of cementite grains with a grain size of 0.10 μm or more in the disclosed embodiments.

The results are shown in Table 3.

TABLE 1

| Steel Type | Chemical Composition (mass %) | | | | | | | | | | |
|---|---|---|---|---|---|---|---|---|---|---|---|
| | C | Si | Mn | P | S | Al | N | Nb | Ti | B | Sb |
| A | 0.45 | 0.22 | 1.29 | 0.01 | 0.001 | 0.03 | 0.002 | 0.008 | 0.031 | 0.0012 | 0.004 |
| B | 0.42 | 0.19 | 1.44 | 0.01 | 0.001 | 0.03 | 0.002 | 0.009 | 0.043 | 0.0022 | 0.007 |
| C | 0.44 | 0.35 | 1.82 | 0.01 | 0.001 | 0.02 | 0.003 | 0.011 | 0.064 | 0.0018 | 0.013 |
| D | 0.51 | 0.15 | 1.13 | 0.01 | 0.001 | 0.02 | 0.002 | 0.008 | 0.025 | 0.0029 | 0.005 |
| E | <u>0.36</u> | 0.23 | 1.94 | 0.02 | 0.001 | 0.03 | 0.003 | 0.008 | 0.022 | 0.0012 | 0.004 |
| F | <u>0.58</u> | 0.34 | <u>2.10</u> | 0.01 | 0.001 | 0.03 | 0.002 | 0.009 | 0.031 | 0.0015 | 0.006 |
| G | 0.45 | 0.26 | <u>1.34</u> | 0.01 | 0.001 | 0.04 | 0.002 | <u>0.0014</u> | <u>0.002</u> | 0.0016 | 0.004 |
| H | 0.43 | 0.27 | 1.35 | 0.01 | 0.001 | 0.04 | 0.003 | 0.009 | 0.025 | 0.0019 | 0.006 |
| I | 0.44 | 0.25 | 1.45 | 0.01 | 0.001 | 0.03 | 0.003 | 0.009 | 0.033 | 0.0022 | <u>0.001</u> |
| J | 0.44 | 0.25 | 1.64 | 0.01 | 0.001 | 0.04 | 0.003 | 0.011 | 0.012 | 0.0016 | 0.012 |
| K | 0.46 | 0.18 | 1.55 | 0.01 | 0.001 | 0.03 | 0.002 | 0.008 | 0.066 | 0.0011 | 0.003 |
| L | 0.51 | 0.22 | 1.36 | 0.01 | 0.001 | 0.04 | 0.003 | 0.009 | 0.022 | 0.0014 | <u>0.002</u> |
| M | 0.35 | 0.22 | 1.45 | 0.01 | 0.001 | 0.03 | 0.002 | 0.008 | 0.020 | 0.0021 | 0.012 |

| Steel Type | Chemical Composition (mass %) Other components | Ti/Sb | Ac$_3$ (° C.) | Ms (° C.) | Note |
|---|---|---|---|---|---|
| A | Mo:0.19, V:0.02 | 7.8 | 788 | 301 | Steel |
| B | Cr:0.16 | 6.1 | 783 | 312 | Steel |
| C | Cu:0.15, Ni:0.21 | 4.9 | 773 | 289 | Steel |
| D | V:0.03, Ca:0.001, Sn:0.03 | 5.0 | 767 | 282 | Steel |
| E | — | 5.5 | 790 | 326 | Comparative Steel |
| F | — | 5.2 | 748 | 217 | Comparative Steel |
| G | Cr:0.13, V:0.05 | <u>0.5</u> | 782 | 301 | Comparative Steel |
| H | — | 4.2 | 786 | 313 | Steel |
| I | — | <u>33.0</u> | 782 | 305 | Comparative Steel |
| J | — | <u>1.0</u> | 779 | 298 | Comparative Steel |
| K | — | <u>22.0</u> | 773 | 292 | Comparative Steel |
| L | — | 11.0 | 767 | 274 | Comparative Steel |
| M | Cr:0.20 | <u>1.7</u> | 799 | 344 | Comparative Steel |

* Underlines indicate parameters outside the range of the disclosed embodiments.

TABLE 2

| Test Piece Number | Steel Type | Hot Rolling | | | | | | Annealing | | | Coating |
|---|---|---|---|---|---|---|---|---|---|---|---|
| | | Heating temperature °C. | Heating time min | FDT °C. | Average cooling rate °C./s | Finish cooling temperature °C. | CT °C. | Average cooling rate °C./s | Soaking temperature °C. | Holding time sec | |
| 1 | A | 1300 | 90 | 880 | 100 | 480 | 450 | 7 | 650 | 300 | CR |
| 2 | B | 1300 | 90 | 900 | 90 | 450 | 450 | 8 | 620 | 500 | EZN |
| 3 | C | 1350 | 120 | 900 | 95 | 500 | 500 | 20 | 680 | 100 | AS |
| 4 | D | 1400 | 90 | 850 | 95 | 450 | 350 | 10 | 670 | 300 | GA |
| 5 | <u>E</u> | 1280 | 160 | 930 | 90 | 480 | 450 | 8 | 650 | 300 | GI |
| 6 | <u>F</u> | 1350 | 90 | 900 | 100 | 450 | 450 | 10 | 650 | 300 | AS |
| 7 | <u>G</u> | 1380 | 100 | 900 | 105 | 480 | 450 | 10 | 650 | 300 | CR |
| 8 | C | 1280 | 160 | 930 | 100 | 450 | 450 | 15 | 670 | 300 | CR |
| 9 | C | 1380 | 90 | 900 | 95 | 480 | 450 | 10 | 650 | 250 | GA |
| 10 | C | 1350 | 90 | 900 | 105 | 450 | 500 | 8 | 670 | 300 | GI |
| 11 | C | 1350 | 120 | 850 | 95 | 450 | 350 | 8 | 650 | 300 | AS |
| 12 | H | 1350 | 90 | 880 | 100 | 480 | 450 | 7 | 650 | 300 | CR |
| 13 | <u>I</u> | 1350 | 90 | 880 | 100 | 480 | 450 | 7 | 650 | 300 | AS |
| 14 | H | 1250 | 90 | 880 | 90 | 480 | 500 | 7 | 680 | 300 | CR |
| 15 | H | 1320 | 140 | 900 | 110 | 500 | 450 | 10 | 650 | 500 | GA |
| 16 | H | 1300 | 100 | 910 | 100 | 450 | 480 | 8 | 660 | 100 | GI |
| 17 | J | 1300 | 120 | 850 | 110 | 480 | 450 | 8 | 680 | 100 | GA |
| 18 | <u>K</u> | 1350 | 100 | 880 | 100 | 450 | 350 | 10 | 660 | 300 | GI |
| 19 | <u>L</u> | 1400 | 90 | 900 | 90 | 500 | 450 | 7 | 670 | 500 | CR |
| 20 | <u>M</u> | 1350 | 80 | 930 | 95 | 480 | 350 | 15 | 650 | 300 | GA |
| 21 | H | 1300 | 100 | 910 | 100 | 450 | 480 | 8 | 660 | 100 | GI |

| Test Piece Number | Hot Pressing | | | | Note |
|---|---|---|---|---|---|
| | Heating temperature °C. | Cooling attainment temperature °C. | Reheating temperature °C. | Holding time min | |
| 1 | 880 | 70 | 160 | 35 | Example |
| 2 | 880 | 50 | 210 | 20 | Example |
| 3 | 800 | 50 | 160 | 2 | Example |
| 4 | 880 | 70 | 110 | 20 | Example |
| 5 | 880 | 70 | 160 | 20 | Comparative Example |
| 6 | 880 | <u>40</u> | 160 | 20 | Comparative Example |
| 7 | 880 | 50 | 160 | 20 | Comparative Example |
| 8 | 880 | 70 | — | — | Comparative Example |
| 9 | 880 | <u>40</u> | <u>260</u> | 20 | Comparative Example |
| 10 | 880 | 50 | <u>50</u> | 20 | Comparative Example |
| 11 | 880 | 50 | <u>190</u> | <u>60</u> | Comparative Example |
| 12 | 980 | 70 | 160 | <u>20</u> | Example |
| 13 | 880 | 60 | 160 | 20 | Comparative Example |
| 14 | <u>750</u> | 50 | 160 | 10 | Comparative Example |
| 15 | <u>1100</u> | 70 | 200 | 40 | Comparative Example |
| 16 | <u>880</u> | <u>320</u> | 180 | 20 | Comparative Example |
| 17 | 900 | <u>50</u> | 190 | 35 | Comparative Example |
| 18 | 880 | 40 | 160 | 20 | Comparative Example |
| 19 | 900 | 70 | 210 | 40 | Comparative Example |
| 20 | 900 | 50 | 160 | 35 | Comparative Example |
| 21 | 880 | <u>150</u> | 180 | 20 | Comparative Example |

* Underlines indicate parameters outside the range of the disclosed embodiments.

TABLE 3

Steel Sheet Microstructure of Hot-Pressed Member

| Test Piece Number | Martensite volume fraction (%) | Prior austenite average grain size (μm) | Cementite grains/μm² | Ti-based carbide grains/μm² | Tensile Property TS MPa | Delayed Fracture Resistance | Note |
|---|---|---|---|---|---|---|---|
| 1 | 99 | 6 | 3.6 | 0.28 | 2230 | A | Example |
| 2 | 98 | 6 | 4.5 | 0.31 | 2315 | A | Example |
| 3 | 99 | 6 | 3.2 | 0.31 | 2344 | A | Example |
| 4 | 99 | 7 | 5.5 | 0.30 | 2564 | A | Example |
| 5 | 98 | 7 | 2.1 | 0.24 | <u>1889</u> | A | Comparative Example |
| 6 | 99 | 6 | 6.2 | 0.26 | <u>2025</u> | B | Comparative Example |
| 7 | 99 | 6 | 3.2 | <u>0.02</u> | 2199 | B | Comparative Example |

TABLE 3-continued

Steel Sheet Microstructure of Hot-Pressed Member

| Test Piece Number | Martensite volume fraction (%) | Prior austenite average grain size (μm) | Cementite grains/μm² | Ti-based carbide grains/μm² | Tensile Property TS MPa | Delayed Fracture Resistance | Note |
|---|---|---|---|---|---|---|---|
| 8 | 99 | 6 | 0.6 | 0.29 | 2031 | B | Comparative Example |
| 9 | 99 | 7 | 4.2 | 0.19 | 2115 | B | Comparative Example |
| 10 | 99 | 7 | 1.1 | 0.28 | 2091 | B | Comparative Example |
| 11 | 99 | 7 | 3.5 | 0.17 | 2156 | B | Comparative Example |
| 12 | 99 | 7 | 3.8 | 0.34 | 2211 | A | Example |
| 13 | 99 | 7 | 3.6 | 0.11 | 2055 | B | Comparative Example |
| 14 | 85 | 4 | 3.1 | 0.25 | 1688 | A | Comparative Example |
| 15 | 99 | 11 | 4.8 | 0.28 | 2200 | B | Comparative Example |
| 16 | 88 | 6 | 6.3 | 0.31 | 1955 | B | Comparative Example |
| 17 | 98 | 6 | 3.4 | 0.16 | 2327 | A | Comparative Example |
| 18 | 99 | 7 | 5.6 | 0.14 | 2241 | B | Comparative Example |
| 19 | 99 | 6 | 6.1 | 0.12 | 2522 | B | Comparative Example |
| 20 | 98 | 7 | 4.4 | 0.15 | 2451 | B | Comparative Example |
| 21 | 93 | 7 | 6.7 | 0.33 | 1997 | A | Comparative Example |

* Underlines indicate parameters outside the range of the disclosed embodiments.

The results in Table 3 indicate that the Examples all have a tensile strength of 2100 MPa or higher and excellent delayed fracture resistance.

The invention claimed is:

1. A hot-pressed member having a chemical composition comprising, by mass %:
   C: 0.42% or more and 0.53% or less;
   Si: 0.01% or more and 0.80% or less;
   Mn: 1.0% or more and 2.0% or less;
   P: 0.03% or less, S: 0.003% or less;
   Al: 0.01% or more and 0.10% or less;
   N: 0.006% or less;
   Nb: 0.003% or more and 0.018% or less;
   Ti: 0.008% or more and 0.100% or less;
   B: 0.0005% or more and 0.0050% or less;
   Sb: 0.003% or more and 0.015% or less; and
   a balance being Fe and incidental impurities,
   wherein Ti/Sb satisfies:

4.0≤Ti/Sb≤10.0, the hot-pressed member has a microstructure in which a volume fraction of martensite is 95% or more, an average grain size of prior austenite is 7 μm or less, a number of cementite grains with a grain size of 0.10 μm or more is 2 grains/μm² or more, and a number of Ti-based carbide grains with a grain size of 0.10 μm or less is 0.28 grains/μm² or more, and
   the hot-pressed member has a tensile strength of 2100 MPa or higher.

2. The hot-pressed member according to claim 1, wherein the chemical composition further comprises, by mass %, at least one selected from the group consisting of Mo: 0.35% or less, Cr: 0.35% or less, V: 0.05% or less, Ca: 0.005% or less, Cu: 0.50% or less, Ni: 0.50% or less, and Sn: 0.50% or less.

3. The hot-pressed member according to claim 1, wherein the hot-pressed member has an Al-based coating layer or a Zn-based coating layer on a surface thereof.

4. A method for producing the hot-pressed member according to claim 1, the method comprising:
   heating a cold rolled steel sheet having the chemical composition to a temperature in a range of an Ac₃ transformation temperature or higher and 1000° C. or lower, followed by hot pressing;
   then cooling the steel sheet to a temperature lower than or equal to Ms temperature minus 200° C.; and
   reheating the steel sheet at a reheating temperature in a range of 100° C. or higher and 220° C. or lower for a holding time in a range of 1 minute or more and 40 minutes or less.

5. The hot-pressed member according to claim 2, wherein the hot-pressed member has an Al-based coating layer or a Zn-based coating layer on a surface thereof.

6. A method for producing the hot-pressed member according to claim 2, the method comprising:
   heating a cold rolled steel sheet having the chemical composition to a temperature in a range of an Ac₃ transformation temperature or higher and 1000° C. or lower, followed by hot pressing;
   then cooling the steel sheet to a temperature lower than or equal to Ms temperature minus 200° C.; and
   reheating the steel sheet at a reheating temperature in a range of 100° C. or higher and 220° C. or lower for a holding time in a range of 1 minute or more and 40 minutes or less.

* * * * *